B. H. SKELLY.
FORCE FEED LUBRICATOR.
APPLICATION FILED DEC. 19, 1919.

1,359,116.

Patented Nov. 16, 1920.
3 SHEETS—SHEET 1.

Inventor
Bernard H. Skelly
by
Attorney

B. H. SKELLY.
FORCE FEED LUBRICATOR.
APPLICATION FILED DEC. 19, 1919.
1,359,116.
Patented Nov. 16, 1920.
3 SHEETS—SHEET 2.
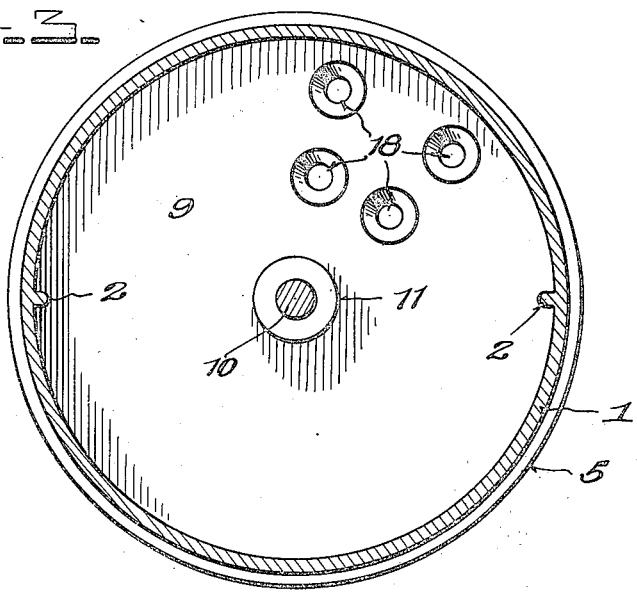
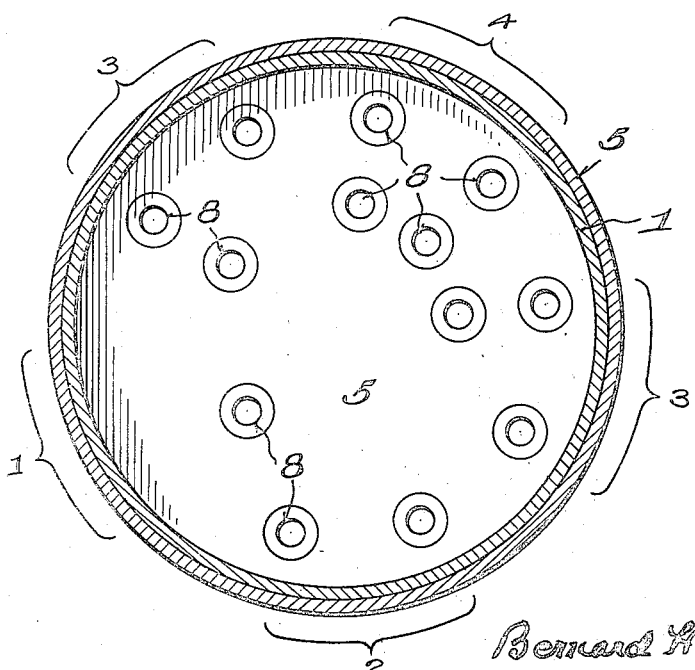
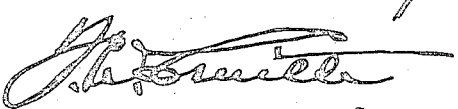

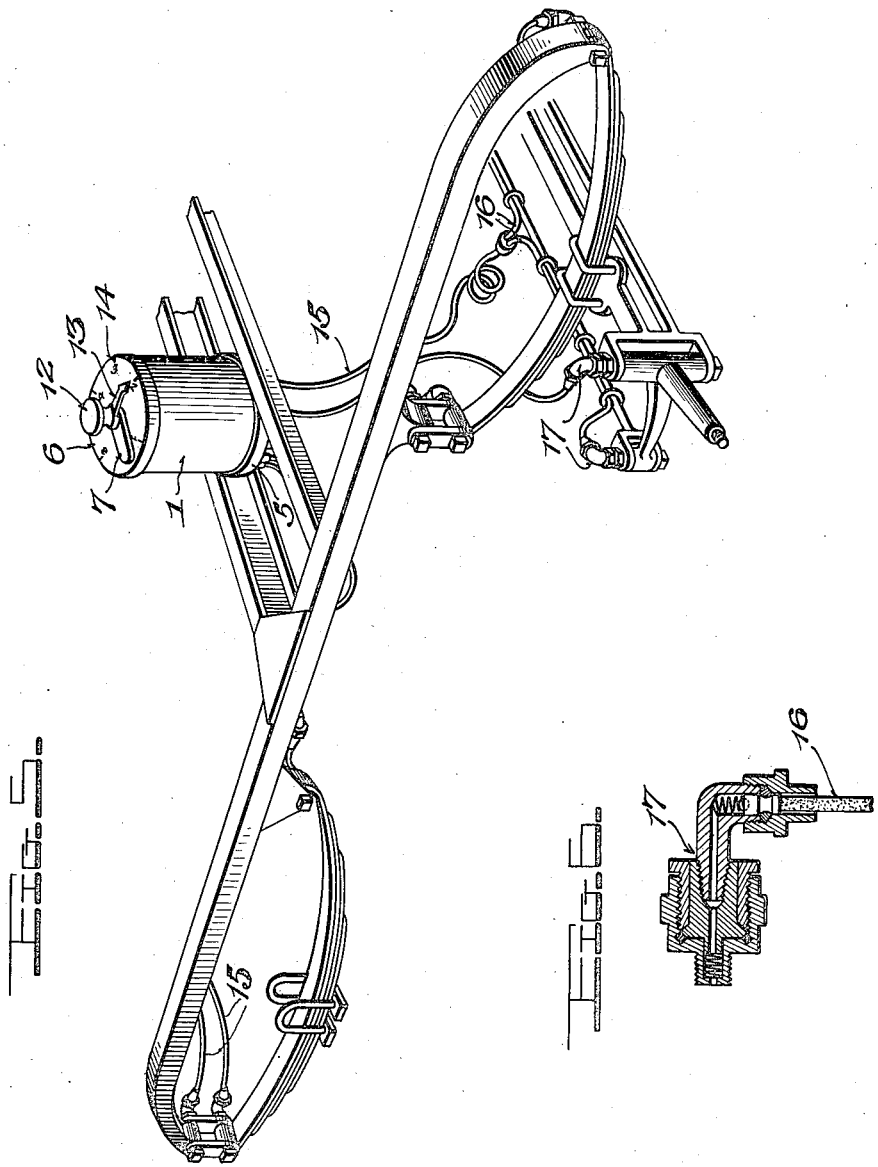

UNITED STATES PATENT OFFICE.

BERNARD H. SKELLY, OF BRIDGEPORT, CONNECTICUT.

FORCE-FEED LUBRICATOR.

1,359,116.   Specification of Letters Patent.   Patented Nov. 16, 1920.

Application filed December 19, 1919. Serial No. 346,064.

*To all whom it may concern:*

Be it known that I, BERNARD H. SKELLY, a citizen of the United States, residing at the city of Bridgeport, in the county of Fairfield and State of Connecticut, have invented certain new and useful Improvements in Force-Feed Lubricators; and I do declare the following to be a full, clear, and exact description of the invention, such as will enable others skilled in the art to which it appertains to make and use the same.

This invention relates to certain new and useful improvements in a force feed grease lubricator especially adapted for effecting lubrication of those bearings of a motor vehicle which are now commonly lubricated through the agency of separate grease cups the employment of which is attendant with many disadvantages well known to operators of motor vehicles.

The principal object of this invention is to provide simple and efficient means whereby these bearings of a motor vehicle may be lubricated in a selective manner from a common source.

The invention broadly comprises a grease container having a plurality of outlets connected by means of conduits to the several vehicle bearings, and valve means for opening and closing the outlets in predetermined groups whereby the bearings may be supplied with the lubricant in a selective manner.

The invention further resides in the features of construction and the arrangements and combination of parts hereinafter described and claimed, reference being made to the accompanying drawings wherein.

Figure 1:
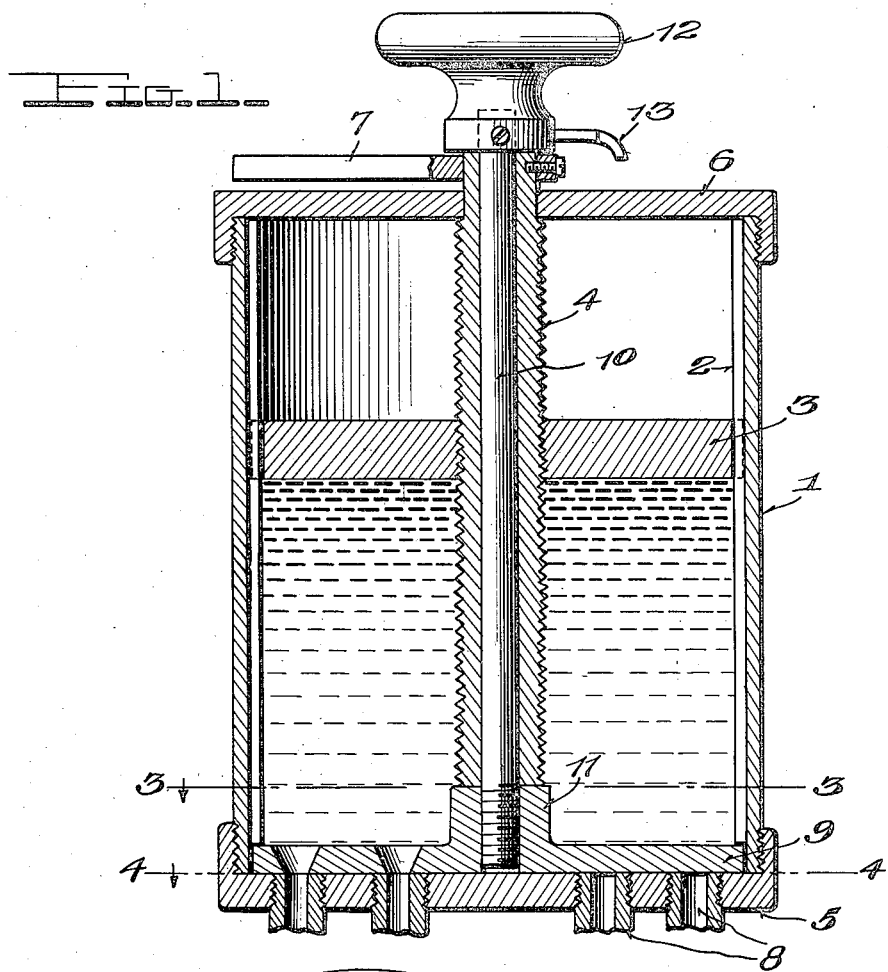
Figure 1 is a vertical section through the improved selective feed lubricator.
Figure 2:
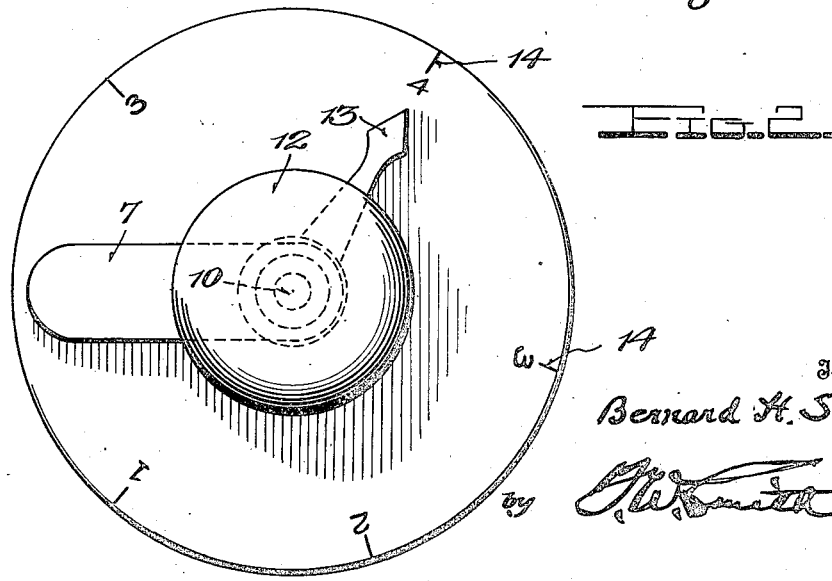
Fig. 2 is a top plan view thereof.

Figs. 3 and 4 are transverse sections on lines 3—3 and 4—4 of Fig. 1:

Fig. 5 illustrates the manner in which the improved construction is assembled on the chassis of a motor vehicle, the latter being depicted in fragment; and Fig. 6 is a detailed section of one of the joints or connections between the conduits and the chassis bearings.

Referring more in detail to Fig. 1, the casing or reservoir 1 has secured or formed at diametrically opposite points on its inner wall a pair of vertical guide ribs 2 designed to be received within a like number of notches formed in the periphery of the plunger or follower 3 whereby the latter is held against turning with its supporting and feeding screw 4. This screw is hollow or tubular and terminates above the bottom 5 while its upper end portion is journaled in the top 6 of the container and projects therethrough. An operating lever or arm 7 is secured to and extends laterally from the projecting upper end of the screw 4. Obviously, swinging the lever 7 will effect feeding of the plunger either upwardly or downwardly corresponding to the direction of rotation of the screw.

The bottom 5 is provided with a plurality of discharge openings or outlets 8 preferably arranged in groups as indicated by brackets 1, 2, 3 and 4 in Fig. 4. These discharge orifices are opened and closed by the selective operation of a valve plate or disk 9 rotatably superposed on the bottom 5, the guide ribs 2 terminating short thereof so as not to obstruct free rotation of said valve. The valve disk is provided with four openings 18 adapted to be brought into registry with the bottom openings comprised within the groups depicted in Fig. 4. This registry is effected upon selectively rotating the valve by means of a rod or stem 10 threaded in the centrally disposed hub or boss 11 of the valve disk, said hub abutting the lower end of the screw 4 and constituting a bearing therefor. The valve stem extends rotatably through the screw and has a manipulating knob 12 fixed on its protruding upper end. A pointer 13, also fixed relative to the stem, traverses a dial 14 marked on the outer face of the casing top 6, the graduations of the dial indicating the groups of discharge openings.

In Fig. 5 is depicted the manner in which the improved lubricator is used, there being employed conduits or lubricant-conducting tubes 15 for connecting the discharge openings 8 to the several chassis or frame bearings, said tubes sometimes having branched terminals 16 which are connected to the respective bearings or points of lubrication by ordinary grease cups (not shown) or by means of tubular unions such as is indicated at 17 in Fig. 6.

In practice it is found desirable and necessary to lubricate certain bearings more frequently than others and to this end it is preferable to connect them up in groups such as is indicated in Fig. 4. Then by manipulating the pointer over its dial the valve openings may be brought into registry with those of the selected group. In this connection it will be noted that group 4 comprises four discharge openings, group 3 three discharge openings, group 2 two openings and group 1 one opening. When the pointer directs toward "1" on the dial the grease contents will be in communication with only one tube 15, the remaining valve openings being disposed over the solid portion of the bottom 5. After the valve has been selectively positioned the handle lever 7 is moved to rotate the screw for lowering the plunger and thereby expelling the lubricant through the valve and discharge openings.

Any number of openings may be provided in the valve and also in the groups of discharge openings, each of the latter being identified with one or more chassis points to be lubricated.

In previous forms of grease cup having plural discharge openings the solid lubricant or grease would flow through only a few of the connected conduits and thereby fail to effect uniform lubrication. With the improved construction the grease is selectively expressed through the various openings 8. Thus, uniformity in lubrication is easily obtained. The construction is simple and compact, being readily assembled and by means of the valve and dial selective lubrication may be effected.

Another advantage of the present lubricator is that certain bearings may be grouped together and lubricated at varying intervals relative to other bearings which do not require such frequent lubrication. Thus, the spindle bearings of an automobile may comprise one group while the spring shackles a second group requiring lubrication at different intervals of time with respect to the spindle bearings.

The compact arrangement of parts affords a construction which may readily be disassembled by unscrewing the stem from the valve and then removing the top. In its assembled position, the valve is held seated by the hollow screw which latter is, in turn, adjusted by the top of the casing.

What is claimed is:

1. A force feed grease lubricator comprising a casing having groups of discharge openings, a valve having a group of openings movable to selectively register with the discharge openings, a rotary feed screw suitably journaled and stationary as to lengthwise movement, a plunger guided within the casing and operable by said screw, and means for moving the valve to register its openings with a selected group of discharge openings.

2. A force feed grease lubricator comprising a casing having groups of discharge openings, a disk valve confined at the bottom of the casing and superposed thereon and having a group of openings and rotatable to selectively register with the discharge openings, a rotatable feed screw journaled in the casing and stationary as to lengthwise movement, a guided plunger within the casing and operable by said screw, and means for moving the valve to register its group of openings with a selected group of discharge openings.

3. A force feed grease lubricator comprising a casing having groups of discharge openings, a valve having openings and movable to selectively register with the discharge openings, a hollow feed screw journaled in the top of the casing and having its lower end seated on the valve, a plunger operable by the screw, and means passing through the screw for moving the valve to register its openings with a selected group of discharge openings.

4. A force feed grease lubricator comprising a casing having groups of discharge openings, a valve having openings and movable to selectively register with the discharge openings, a hollow feed screw journaled in the top of the casing and having its lower end seated on the valve, a plunger operable by the screw, a stem journaled in the hollow screw and extending therethrough, the valve being secured to the lower end of the stem and a pointer carried by the upper end of the stem and coöperating with a dial on the top of the casing for governing the selective position of the valve.

In testimony whereof I affix my signature in presence of two witnesses.

BERNARD H. SKELLY.

Witnesses:
T. W. SMITH,
M. I. LANGDEN.